Sept. 25, 1923. Re. 15,688

F. CAPRONI

FLYING MACHINE

Original Filed July 24, 1916 3 Sheets-Sheet 1

Federico Caproni
INVENTOR,

BY

Rogers, Kennedy & Campbell,
ATTORNEYS.

Sept. 25, 1923. Re. 15,688

F. CAPRONI

FLYING MACHINE

Original Filed July 24, 1916 3 Sheets-Sheet 2

Federico Caproni
INVENTOR,

BY

Rogers, Kennedy & Campbell
ATTORNEYS.

Sept. 25, 1923. Re. 15,688

F. CAPRONI

FLYING MACHINE

Original Filed July 24, 1916 3 Sheets-Sheet 3

Federico Caproni
INVENTOR,

BY

Rogers, Kennedy & Campbell,
ATTORNEYS.

Reissued Sept. 25, 1923. Re. 15,688

UNITED STATES PATENT OFFICE.

FEDERICO CAPRONI, OF MILAN, ITALY.

FLYING MACHINE.

Original No. 1,325,230, dated December 16, 1919, Serial No. 110,850, filed July 24, 1916. Application for reissue filed December 15, 1920. Serial No. 430,993.

*To all whom it may concern:*

Be it known that I, FEDERICO CAPRONI, a subject of the King of Italy, residing at Milan, Italy, have invented certain new and useful Improvements in Flying Machines, of which the following is a specification, reference being had therein to the accompanying drawing.

The present invention relates to multiplane flying-machines, and, in some respects, especially a triplane. An object is the efficient and durable construction of such machines. Other objects are to secure great power and efficiency, capability of maintaining great stability in the air, and facility of landing.

To the attainment of these objects and advantages the invention consists in the novel features of construction, combination, arrangement and detail herein shown or described.

In the annexed drawings is represented a triplane embodying the improvements that form the subject of the present invention.

Figure 1:
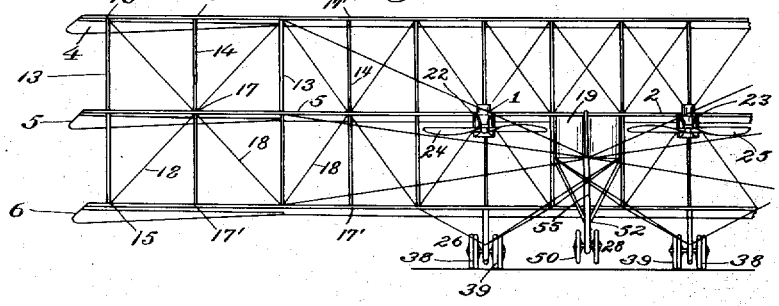
Figures 1, 2 and 3 represent respectively a front elevation, a plan view and a side elevation of a triplane.
Figure 2:
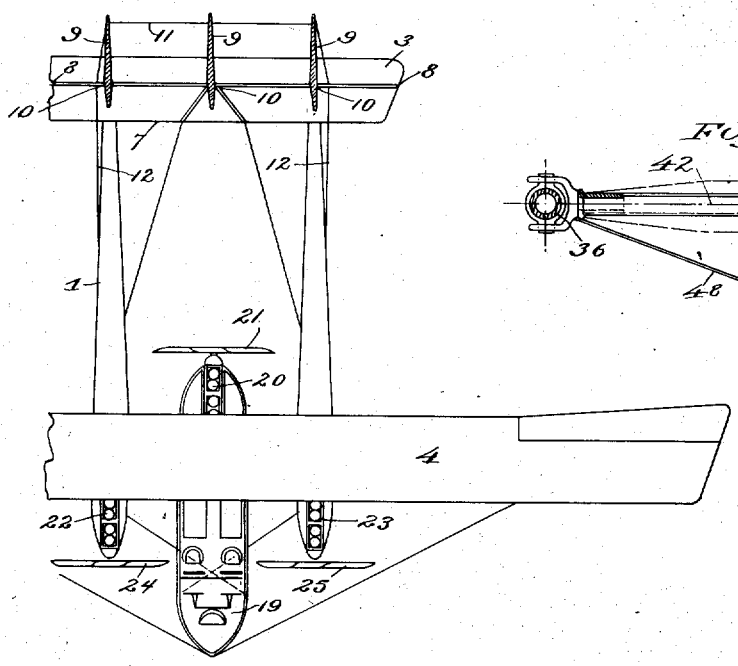
Figure 6:
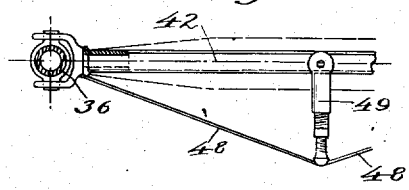
Figure 6 is a detail view of a portion of said carriage on a larger scale.

In the illustrated embodiment the details of the triplane may be described as follows. It comprises two fuselages 1, 2, symmetrically arranged with respect to the center line of the apparatus. Such fuselages are fixed by their fore-ends to the forward body formed by sustaining planes 4, 5, 6, preferably beneath the middle plane 5. At the rear end of the fuselages 1, 2, are mounted the following planes: A tail plane 7, a horizontal rudder 3, rotatably connected to the horizontal axle 8, three vertical rudders 9, rotatably mounted on axles 10 and joined to one another by means of wires 11, to insure simultaneous rotation of same.

The rudders 9 are operated by means of wires 12 which extend to points adjacent the aviator's seat where suitable mechanism is provided for operating the wires. The rudder 3 is operated in a similar way by wires not shown.

Figure 3:
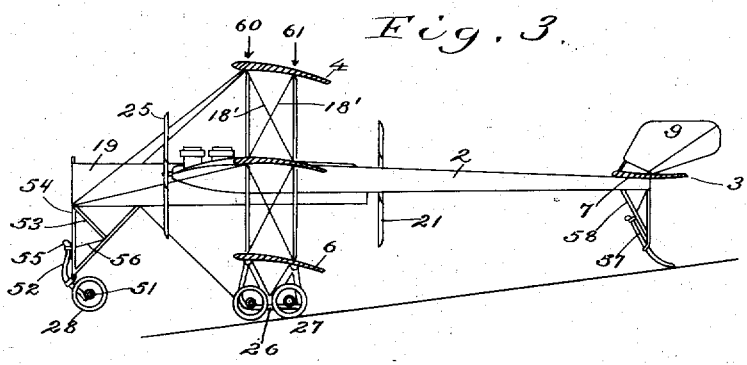

The three superposed planes 4, 5, 6, are interconnected and braced in a novel and advantageous manner. The cellular construction comprises between each pair of planes two upright rows of strut members. The front row is marked 60 and the rear row 61 in Fig. 3, the one row corresponding with the other, that is, there being a rear strut behind each front strut. The uprights 13, at both front and rear, are fixed by their upper and lower ends 16 and 15 respectively to the longitudinal frame members embodied in the top and bottom planes 4 and 6, and their centers are attached to the middle plane 5. The uprights 14, at both front and rear, are connected at their centers 17 to the middle plane, and at their upper and lower ends 17′ to the longitudinals of the top and bottom planes 4 and 6. The upright 13 or 14 is not required to be formed in a single piece, but can consist of two sections, one between planes 4 and 5, the other between 5 and 6.

Figure 7:
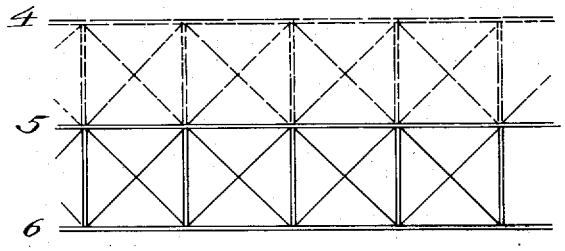
Figs. 7 to 10 are diagrams for explaining the present invention, Fig. 7ª being a side elevation and Figs. 7, 8, 9 and 10 being front elevations.
Figure 7A:
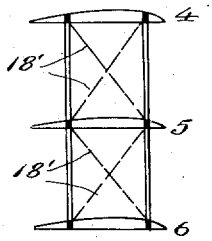

The characteristic of the present invention is in the combined arrangement of the described upright struts, in a triplane, with the diagonal stays or cables, each strut and stay extending from the top plane to the bottom plane. The prevailing construction of triplanes before my invention involved a biplane structure duplicated for each pair of planes. Thus in Fig. 7 the planes 5 and 6 and full line members constitute the usual biplane. On adding the third plane 4 the members between 5 and 6 were retained and duplicates of them provided between 5 and 4. I consider this a disadvantageous triplane, heavy, cumbrous, offering too much resistance and receiving too much strain.

Figure 8:
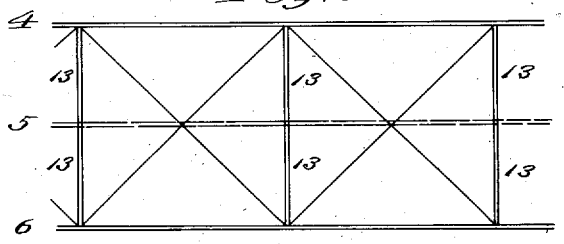
Figure 9:
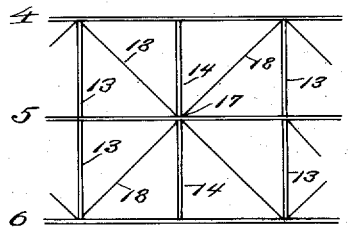
Figure 10:
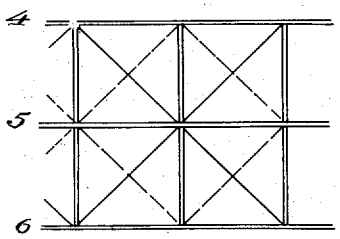

According to my plan, the contrary of the preceding, I produced rigid trellises, as indicated by Fig. 8, by the upright struts 13, extending rigidly from the top to the bottom plane, and connected to all the planes. Then to reduce bending strain and distortion I applied the long diagonal cables from corner to corner of each trellis, and fixed these, at the point 17, to the longitudinals or wing beams of the middle plane 5. Finally I applied the struts 14, as Fig. 9 shows, extending from the points 17 up and down to the longitudinals of the top and botom planes. This scheme of construction reduces the members and the resistance and consequently the bending strains. The novelty is in the manner in which the uppermost and lowermost of the three planes are interconnected, by the long rigid uprights and the long diagonal cables. The further cables shown in dotted lines in Fig. 10 are dispensed with, for the supplemental struts 14 give the necessary steadiness to the intermediate points of the top and bottom planes.

By means of metallic cross-pieces the illustrated system of stays or wires 18 is connected to the planes and struts or uprights at the several points 15, 16, 17 as shown.

The great value and efficiency of this arrangement can be demonstrated. It is believed to be a wholly novel system of bracing for triplanes and gives a determined and maximum strength with minimum air resistance.

As another feature, it will be observed that the angles of incidence of the planes 4, 5, 6, and their curvatures are different and are established in such a way as to obtain an improved distribution of the pressures on said planes, and the compressions and tensions in the bracing system.

The angle of incidence of the upper plane 4 is smaller than that of the lower plane 6, and the intermediate plane 5 has an angle of incidence comprised between those of the other two. Moreover, the curvature on the back of surface 4 is such as to cause the highest depression, while the curvature underneath the surface 6 shall be such as to cause the highest compression or elevation force.

The car 19 is centrally mounted to extend through the front body, preferably between the middle and lower planes. Carried on the car are the aviator-seat, the control devices, and at the rear end the motor 20 driving the propeller 21.

Two further motors, 22, 23, are arranged on the forward ends of the fuselages 1, 2, which ends project outside the front frame. The motors 22, 23, are connected to drive the forward propellers 24, 25.

This arrangement of opposite tractor propellers at the front and a central pusher propeller rearward of the body is a feature of value, giving a well balanced driving action, and one which is but slightly unbalanced by the stopping of one or two of the motors.

The landing carriage comprises three sets of wheels, 26, 27, at the sides, and a forward wheel or wheels 28. The sets 26, 27, are alike and are mounted underneath the front body or planes, and symmetrically arranged in respect to the central line of the apparatus, and beneath the fuselages 1, 2.

The frames carrying the side wheels 26, 27 are so constructed as to distribute the several strains caused by landing and minimize the resistance of air to progressive movement. The fitting of the wheels on their frames is effected by suitable elastic means in order to afford yielding resistance to the strains caused by landing.

Figure 4:
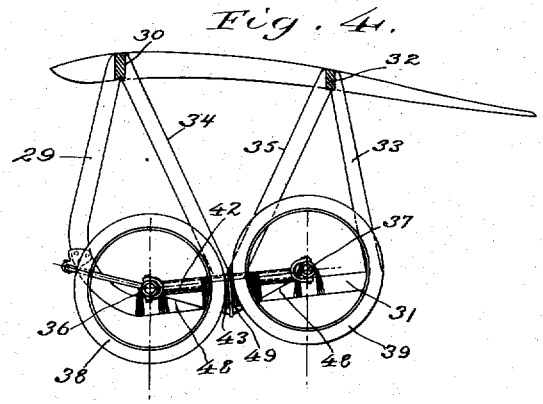
Figures 4 and 5 represent on a larger scale a side view and a plan view of part of the landing carriage.
Figure 5:
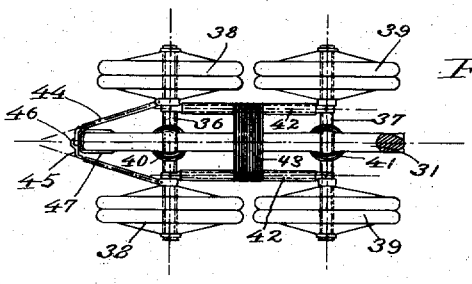

The details are shown in Figs. 4 and 5. The frame members 29 are made of compound wood so that they will be free from distortion, and are flat in form. Each member 29 is fixed by its upper end to the longitudinal frame member 30 of the lowest plane 6; and it is shown as extending downward and curved rearward and prolonged into a central bar 31, parallel with and beneath axis of the corresponding fuselage.

The end of the bar 31 is connected to the rear longitudinal frame member 32 of the lower plane by means of a rigid upright 33. Extending from the longitudinal frame members 30 and 32 and connecting to the middle part of bar 31 are arranged the rigid strengthening bars 34, 35.

Each set of wheels 26, 27, on the landing wheels comprises in fact four wheels, two of which 38, 38, are at the front, the others 39, 39, at the rear end of the carriage central bar 31. The axles 36, 37, of these two couples of wheels are supported at their centers by bar 31 and are bound yieldingly into place, for example by cables or elastic bands, preferably consisting of caoutchouc. The axles 36, 37, are connected to one another by means of metallic rods 42, through joints, such rods likewise being mutually bound or surrounded by elastic bands 43, which also pass around the bar 31. The bands thus all cooperate to yieldingly hold down the landing wheels, and reduce the shock of contacts. The fore axle 36 is connected by means of rods 44 to the ends of a rocking member 45, such member being connected by its center through a joint 46 to a support 47, fixed on the curved part of the member 29.

Underneath each rod 42 is arranged a stay or wire 48, with a strut or upright 49 between it and the rod, such arrangement having for its object to brace said rod against strain. The forward pair of landing wheels 28 also preferably have their axle 51 elastically connected, namely by means of a supporting arm or lever 52. This member is pivoted to a supporting bracket of which the main upright 54 is elastically connected with the upper end of lever 52 by means of elastic bands 55, which can yield slightly to ease any shock on the wheels 28. A stay 56 is shown to counteract the strain caused by landing. Each rear skid 57 may be similarly yieldingly joined to its bracket 58.

The triplane thus described will be seen to embody the principles and attain the objects and advantages of the present invention; and further advantages will be understood to those skilled in the art. Since many matters of combination, arrangement, structure and detail may be variously modified without departing from the features constituting the invention, it is not intended to limit the invention to such matters except so far as specifically recited in the appended claims.

What is claimed is:

1. A triplane flying machine comprising in combination two fuselages symmetrically arranged with respect to the center line of the apparatus, two motors arranged on the forward ends of said fuselages, propellers attached to said motors, a motor in center with propeller, a tail plane and a horizontal rudder mounted upon the rear end of said two fuselages.

2. In a multiplane flying machine, a landing carriage comprising in combination, a wheel frame, front and rear wheel axles, on said frame, means yieldingly holding a wheel axle in place upon the frame, and a movable member interconnecting the front and rear axles.

3. Flying machine as in claim 2 and wherein elastic wrappings yieldingly hold both wheel axles in place on the frame, and a rocking connection is provided between the frame and the member interconnecting the two axles.

4. Flying machine as in claim 2 and wherein an additional means is provided for yieldingly holding the interconnecting member in place.

In testimony whereof, I have affixed my signature hereto.

FEDERICO CAPRONI.